March 5, 1935.　　　L. C. DE SPAIN　　　1,993,210
METERING DEVICE
Filed July 30, 1932　　2 Sheets-Sheet 1
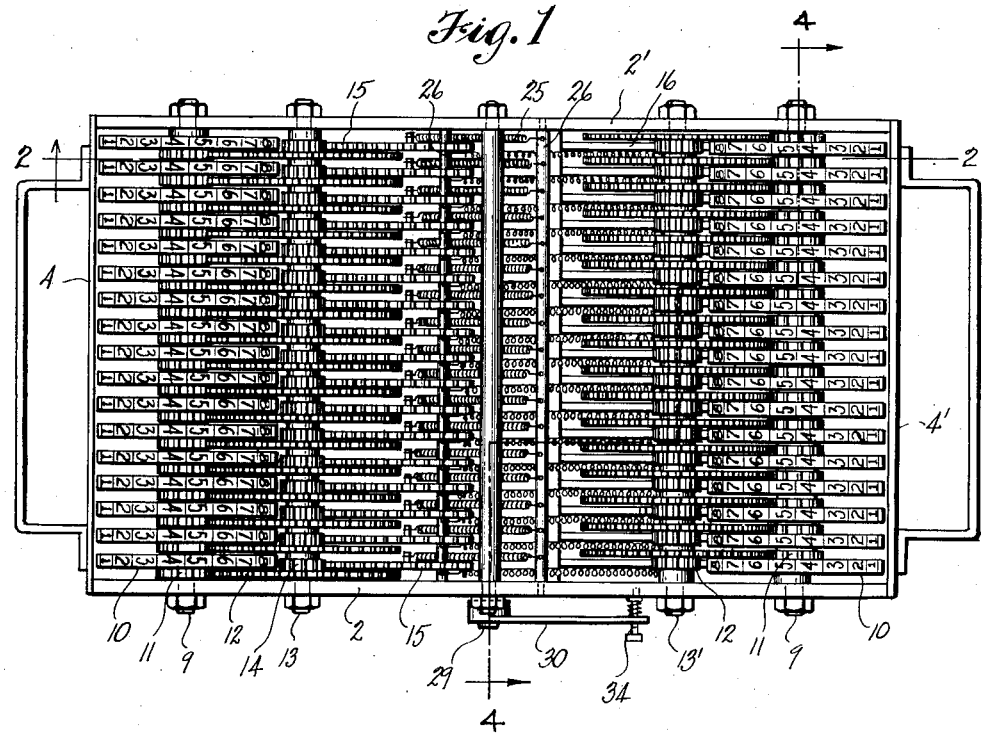
Fig. 1
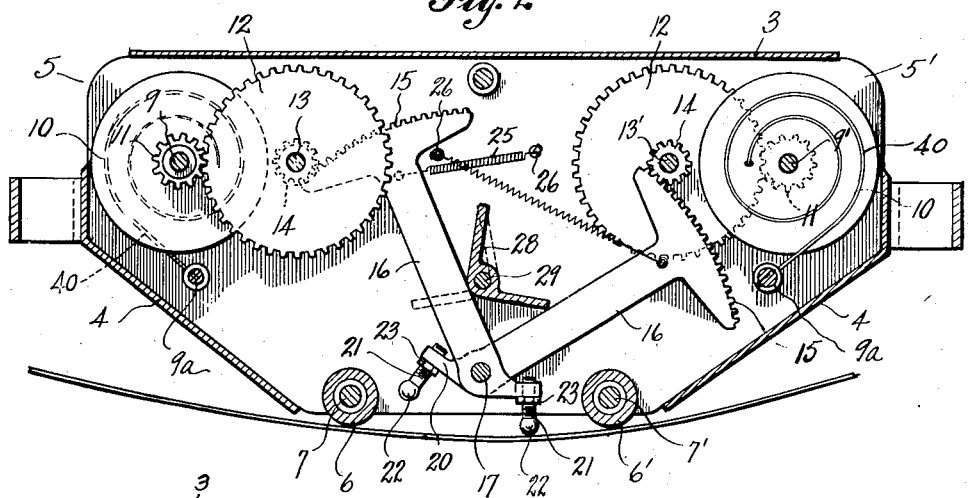
Fig. 2
Fig. 2a
INVENTOR
L. C. DE SPAIN
BY
Cook & Robinson
ATTORNEY March 5, 1935.   L. C. DE SPAIN   1,993,210
METERING DEVICE
Filed July 30, 1932    2 Sheets-Sheet 2
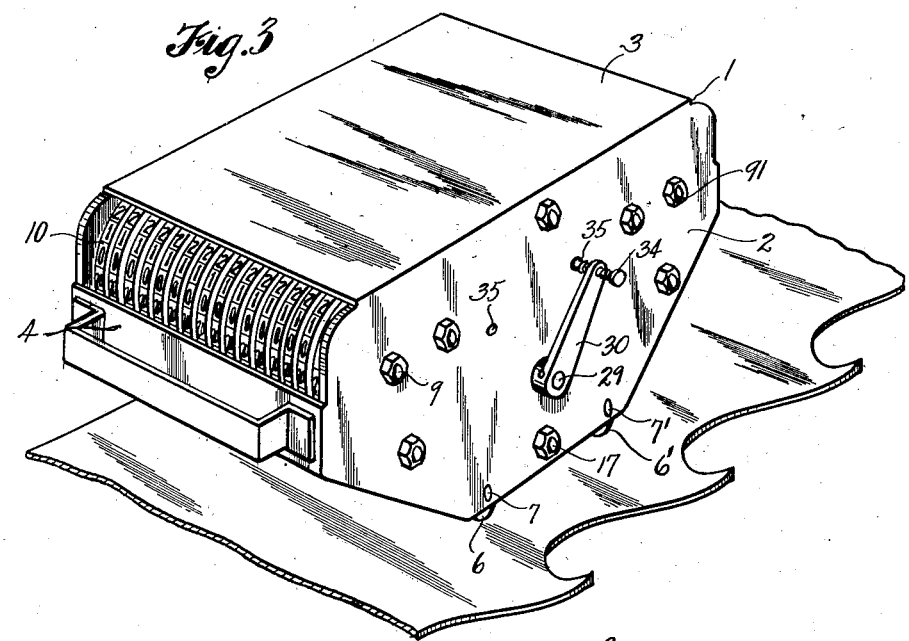
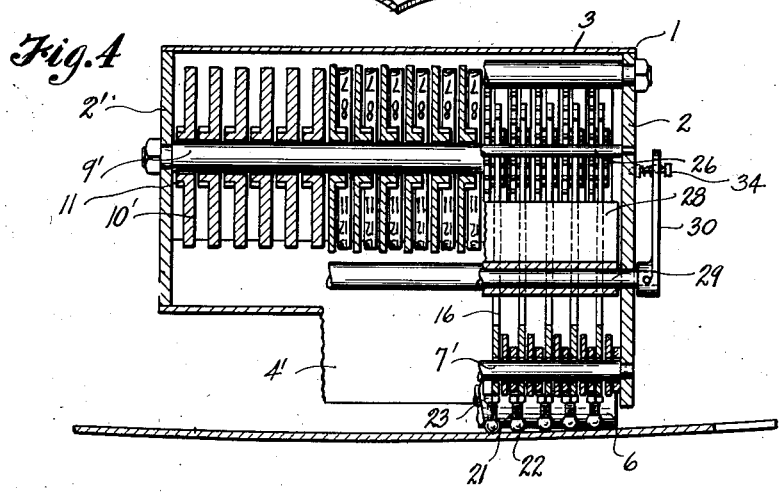
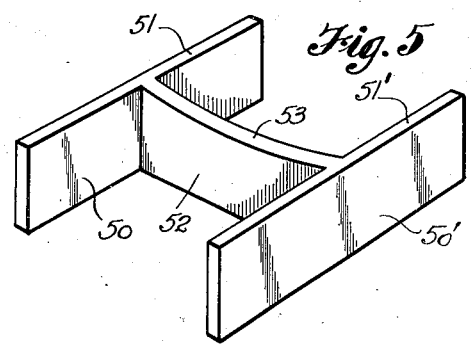
INVENTOR
L. C. DE SPAIN
BY
Cook & Robinson
ATTORNEY Patented Mar. 5, 1935

1,993,210

UNITED STATES PATENT OFFICE 1,993,210

METERING DEVICE

Leo C. De Spain, Longview, Wash.

Application July 30, 1932, Serial No. 626,612

1 Claim. (Cl. 33—202)

This invention relates to a metering and measuring instrument that is designed especially for use in the process of tensioning circular and band saws.

Explanatory to the present invention, it will be here stated that one of the most important operations in making and proper maintenance of saws, especially large circular saws and band saws of the kinds used in lumber mills, is the hammering and stretching to provide proper tensioning. Tension in a saw, as referred to in the present instance, is the stretching of the central portions of the saw so that in use the strain will be taken by the outer edge portions. The hammering and stretching of the saw is to make it slack or longer in the central portion than at the edges. In a band saw the stretching of the central portion by hammering or rolling, throws the tension or strain on the edges of the band and in order that the greatest amount of strain will be placed on the cutting edge, the back edge is stretched longer than the cutting edge, perhaps one sixty fourth of an inch in every five inches, and therefore the cutting edge, being shorter than the remaining portion, will remain taut in use while the central and back portion will serve as a support and guide. The unstretched edge portions of band saws are referred to as "tires" and they must be shorter than the central portion in order for the saw to run true under load. On a band saw twelve inches wide the tires are approximately one and one-fourth inches wide.

Circular saws are hammered for speed, that is, the momentum of the saw or the speed at which the rim travels operates to take up the slack in the central portion of the saw between the eye and the rim. The rim must stretch in the circular saw the same as the tires of the band saws. When a saw is properly tensioned and is shaken the body portion only of the saw should vibrate while the rim portion should be quite steady.

Hard use of a properly tensioned saw will have the effect to throw it out of proper tension. Also, a saw may, by reason of strain, twists, jams or overheating, develop high or low spots. High spots are called "tight places" and low spots are referred to as "loose places". Tight spots do not stretch but crack and break, or cause the cutting edge to become long in that particular region and this operates to throw the strain on the tight place. Loose spots are those which contain too much slack. Both high and low spots must be corrected in order to maintain a saw in proper working condition.

In the manufacture of circular saws, the tension is placed in the saw by hammering to stretch the metal along circular lines between the rim and hub portions. In band saws the tension is applied by hammering the body along lines parallel with the edges and within the longitudinal central portions. Such hammering will give the circular saw a sort of shallow saucer form and it will give band saws a transversely cupped or trough like form.

Heretofore, testing the tension of a saw has been done by use of a straight edge placed radially of the saw if it is a circular saw, and transversely across the band if it is a band saw. In this way the tester, by sight, locates the high and low spots and generally when such spots are found they are marked with chalk and then corrected by hammering against the high side with a round nosed hammer. The higher spots along any transverse line should always be hammered out first to effect the most satisfactory results.

The measuring and metering of a saw by use of a straight edge cannot be satisfactorily done except by persons long experienced in the art of tensioning saws. It is a fact that there are very few mechanics or testers qualified for this work except in the larger mills of the country. Even then, the accuracy with which a saw may be tensioned is dependent upon the eyesight and experience of the tester for it is by eyesight, and the use of the straight edge, that the high spots and low spots are located. It will be mentioned also that it is exceedingly difficult for those of long experience to accurately distinguish between high spots and low spots of only a few thousandths of an inch difference.

In view of the above, it has been the object of this invention to provide a saw tension metering instrument which operates mechanically to indicate visibly the tension of a saw and whereby defects may be located and the height of spots indicated to the thousandth part of an inch. Also, to provide a device of that character that is useful either on circular or band saws of various size.

More specifically stated, the invention resides in the provision of a measuring device in which there are a series of graduated dials, each of which is arranged to be individually actuated by a contact member and the several contact members are arranged in alinement for contact with the surface of a saw being tested along a transverse line for band saws or a radial line for circular saws, thereby to actuate their respective dials for indicating the trueness of the surface relative to a line of tension that is to be followed.

In accomplishing these and other objects of the invention, I have provided the improved details of construction, the preferred forms of which are illustrated in the accompanying drawings, wherein—

Fig. 1 is a plan or top view of the device with the top or cover portion of the housing removed for purpose of better showing the interior.

Fig. 2 is a cross section taken on line 2—2 in Fig. 1.

Fig. 2a illustrates a pointer construction as an alternative for use in lieu of the graduated dials.

Fig. 3 is a perspective view of the device as used in metering a band saw.

Fig. 4 is a cross section as seen on the line 4—4 in Fig. 1.

Fig. 5 is a perspective view of a template used for setting the device to a desired tension.

Referring more in detail to the drawings—

The device, in a form of construction found to be practical, comprises a box like housing 1 formed with opposite side walls 2—2', a top wall 3, and opposite end walls 4—4' which terminate below the top wall to provide open spaces as at 5—5' in Fig. 2 at opposite ends of the housing through which the tension indicating dials, presently described, are visible.

The bottom of the housing is left open and two spaced apart rollers 6—6' are mounted by axles 7—7' in parallel relation transversely across this opening as supports by which the housing may be moved along a surface being tested; these rollers being symmetrically located at opposite ends of the medial, transverse plane of the housing.

Fixed within the housing, transversely thereof and near the end openings, are cross shafts 9—9' on which a series of indicating dials 10 are revolubly mounted in close relation; the outer edge portion of each dial being visible through the adjacent opening 5 or 5' at that end of the housing. Each dial has a small gear wheel 11 fixed coaxially thereto in mesh with a larger gear 12; the gear wheels 12 for each being mounted to rotate on cross shafts 13—13' fixed in the housing.

Each of the wheels 12 has a small gear 14 fixed coaxially thereon and each of these gears has a gear segment 15 operatively in mesh therewith. The gear segments, as seen in Fig. 2, are formed at the outer ends of levers 16 and concentric of a cross shaft 17 which mounts the various levers. The cross shaft 17 is secured at its ends in the housing walls 2—2' transversely of the housing and parallel with and centrally between the supporting rollers 6—6'. It will be observed also by reference to Fig. 2 that the dials and corresponding gears, segments, levers, etc. are of the same size and character so that they all have a corresponding action. Also, the devices at opposite ends of the housing are alike in construction and in operation and the two sets are provided only as a matter of convenience for testing saws of different tension.

Each of the gear segment levers 16 is provided at its lower end with a short angularly extending arm 20. All of those arms associated with the levers for actuating the mechanism or dials at one end of the housing extend to the same extent toward the opposite end of the machine, and each arm is provided at its end with an adjustable contact member in the form of a bolt 21 with a round head 22 at its lower end. These bolts are threaded upwardly into the arms and are held in adjustment by lock nuts 23. All of the contact members of each set of levers are in transverse alinement and are arranged for contact with the surface upon which the device may be disposed. Also, they are held yieldingly against the surface by the action of coiled springs 25 that have ends attached to the levers and to cross shafts 26 so that the pull of the springs 25 is in proper direction to urge the contacts against the surface being tested.

Centrally of the housing is an annular rocker plate 28 fixed on a cross shaft 29 which extends revolubly through the side walls of the housing and at one side has a lever 30 fixed thereto for rotating the rocker to a position at which a flange thereof will engage and hold all the levers of one set in a non-functional position; that is, all of one set will be held against movement as are those at the right hand side in Fig. 2, in which their contact members 22 are raised clear of the surface and all those of the other set of levers are free for contact therewith.

To hold the adjustment of this rocker, the lever 30 is provided at its outer end with a latch pin 34 designed to be seated in holes 35 provided for it in the side wall.

The arrangement of the various parts is such that when a set of levers is left free for action, as are the levers at the left in Fig. 2, their springs 25 will tend to hold all levers against the base of the rocker, and when they are in this position, the gearing which connects them with their respective dials, will operate to set the dials at zero position relative to the top edge of the side walls 4 and 4'. The edges of these walls are parallel with the shafts on which the dials are mounted and closely adjacent the periphery of the dials to serve as a gauge to which adjustment of the dials is made for any particular tension.

As seen best in Figs. 1 and 2, the dials are graduated and marked and it is preferred to so gear the various connections that a movement of one-thousandth of an inch of the contact members 22 will cause a rotary movement of approximately one-fourth inch in the dial associated therewith.

In order that slack in gears or segments will not operate to cause inaccuracy in readings, I have applied a small spiral spring 40 as in Fig. 2, to each dial, one end of the spring being attached to the dial and the other end to a fixed part of the housing, such as the cross shafts 9a and 9a which extend between the side frames 2 and 2'. These springs operate in opposed relation to the springs 25 and take up all slack in the gears.

In Fig. 2a, I have shown an alternative form for the graduated dials. In this view, 43 designates a pointer that is fixed to shaft 9 and its end, relative to the position in opening 5, or its relation to other pointers would indicate variation from proper tension of the saw.

In Fig. 5 is illustrated a template that may be used for adjusting the contact members to a certain curvature which will corespond to the transverse or radial curvature of a properly tensioned saw. This device comprises two parallel rails 50—50' with parallel top edges 51—51' in the same horizontal plane. These rails are centrally connected by a transverse web 52, the top surface 53 of which is curved in accordance with a desired curvature to which the tension of a saw is to be set. The bottom edge of the web 52 is straight across and is in the same plane as the bottom edges of the rails 50—50'. Therefore, by inverting this template it may be used to seat the contacts on a straight line. The manner of seating the contacts to conform to the surface 53 of the template would be to place the device upon the template so that two transverse rollers 6—6' will rest at their ends upon the rails 50—50', respectively, with a row of contacts 22 resting against the top surface 53 of the web. Then, by adjusting each of the dials to a position at which the zero line will be in alinement with the top edge of the end wall 4, and by adjusting the contact bolts corresponding to the various dials against the surface 53, this will cause the contacts to be in proper curvature for testing. Then by placing the device upon a saw blade as in Fig. 3, any differentiation of tension from this line will be indicated by a variation of the dials from the zero position. That is, if there is a high spot on the saw beneath any of the contacts, it will cause a rotary adjustment of the dial corresponding to that contact and the rotation will indicate to the tester the height of this particular spot above the proper tension. Thus, by reading the various dials the tester may determine where the high spots are and whether or not one spot is higher than the other.

By providing the device with two sets of dials one set may be set to a desired curvature and the other may be set to a straight line, or the two sets may both be set to a straight line or lines of different curvature.

While I have described the device as being primarily intended for use in testing saws, it is readily apparent that it might be used for testing any surface where it is desired to locate high or low spots in it, and the number of dials used could be varied to meet any special condition or character of work.

Having thus described my invention, what I claim as new therein and desire to secure by Letters Patent is—

A device of the character described comprising a housing, a pair of parallel rollers for supporting the housing in rolling contact upon a tested surface, a cross shaft, a series of graduated dials, rotatable thereon, another cross shaft, an actuating lever for each dial mounted pivotally on the second shaft and having a contact member in one end for engagement with the surface being tested and having operative connection with the dial at its other end for actuating the latter, and springs attached to the levers to hold the contacts against the surface.

LEO C. DE SPAIN.